US012062275B2

(12) United States Patent
Turner et al.

(10) Patent No.: US 12,062,275 B2
(45) Date of Patent: Aug. 13, 2024

(54) SYSTEM AND METHOD FOR TELEMATICS ACCOUNTS ON-THE-GROUND SAFETY

(71) Applicant: HARTFORD FIRE INSURANCE COMPANY, Hartford, CT (US)

(72) Inventors: David J Turner, Farmington, CT (US); Joseph M. Samela, III, Bristol, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 224 days.

(21) Appl. No.: 17/457,159

(22) Filed: Dec. 1, 2021

(65) Prior Publication Data

US 2023/0169845 A1    Jun. 1, 2023

(51) Int. Cl.
| | |
|---|---|
| G08B 25/00 | (2006.01) |
| G06Q 40/08 | (2012.01) |
| G08B 27/00 | (2006.01) |
| H04W 4/02 | (2018.01) |
| H04W 4/44 | (2018.01) |
| H04W 4/90 | (2018.01) |

(52) U.S. Cl.
CPC .......... *G08B 25/006* (2013.01); *G06Q 40/08* (2013.01); *G08B 27/001* (2013.01); *H04W 4/027* (2013.01); *H04W 4/44* (2018.02); *H04W 4/90* (2018.02)

(58) Field of Classification Search
CPC ..... G08B 25/006; G08B 27/001; H04W 4/90; H04W 4/44; H04W 4/027; G06Q 40/08
USPC .................................................... 455/404.01
See application file for complete search history.

(56) References Cited

U.S. PATENT DOCUMENTS

| | | | |
|---|---|---|---|
| 9,652,748 | B1 | 5/2017 | Sanchez |
| 10,111,078 | B2 | 10/2018 | Gellens et al. |
| 10,255,639 | B1 | 4/2019 | Friedman et al. |
| 10,600,127 | B1 | 3/2020 | Wasserman et al. |
| 10,807,593 | B1 | 10/2020 | Nave et al. |
| 10,915,840 | B1 | 2/2021 | Brandmaier et al. |
| 10,997,849 | B1 | 5/2021 | Potter et al. |
| 11,069,221 | B1 | 7/2021 | Potter et al. |
| 2016/0029197 | A1 | 1/2016 | Gellens |
| 2016/0105784 | A1 | 4/2016 | Gellens et al. |
| 2018/0025648 | A1* | 1/2018 | Zlojutro ................. G06Q 50/26 340/935 |
| 2021/0092573 | A1* | 3/2021 | Shi ......................... B60W 30/09 |
| 2023/0066525 | A1* | 3/2023 | Cabanas ................ H04W 4/029 |

* cited by examiner

*Primary Examiner* — Maria El-Zoobi

(74) *Attorney, Agent, or Firm* — Buckley, Maschoff & Talwalkar LLC

(57) ABSTRACT

Some embodiments are directed to an emergency response system implemented via a back-end application computer server. A vehicle telematics data store may contain electronic records and each electronic record may include, for example, an electronic record identifier and at least one vehicle operation parameter (e.g., a vehicle speed, an accident location, an accident time of day, etc.). The computer server may receive, from an emergency responder (e.g., a police officer, ambulance, firefighter, etc.) via an interactive graphical emergency responder interface display, a vehicle tag (e.g., based on a QR code). The computer server may then retrieve, from the vehicle telematics data store, a vehicle operation parameter associated with the vehicle tag and update the display based on the retrieved a vehicle operation parameter associated with the vehicle tag.

19 Claims, 13 Drawing Sheets

SYSTEM AND METHOD FOR TELEMATICS ACCOUNTS ON-THE-GROUND SAFETY

TECHNICAL FIELD

The present application generally relates to computer systems and more particularly to computer systems that are adapted to accurately and/or automatically provide vehicle telematics data to emergency responders.

BACKGROUND

Emergency Medical Service ("EMS") providers in the US make decisions about the most appropriate destination hospital for injured patients. For example, a police officer or ambulance responding to a car crash may evaluate a party involved in the accident (e.g., to determine if the person should be sent to an emergency room for treatment). These decisions are made through a decision process known as "field triage," which involves an assessment not only of the physiology and anatomy of the injury but also of the mechanism of the injury and special patient considerations. The goal of the field triage process is to ensure that injured patients are transported to a trauma center or hospital that is best equipped to manage their specific injuries in an appropriate and timely manner. Specific information about the operation of the vehicle at the time of the accident (e.g., how fast was the car moving) might be helpful to this decision-making process.

It would therefore be desirable to provide improved systems and methods to accurately and/or automatically provide vehicle telematics data to emergency responders. Moreover, the results should be easy to access, understand, interpret, update, etc.

SUMMARY OF THE INVENTION

According to some embodiments, systems, methods, apparatus, computer program code and means are provided to accurately and/or automatically provide vehicle telematics data to emergency responders in a way that provides fast and useful results and that allows for flexibility and effectiveness when responding to those results.

Some embodiments are directed to an emergency response system implemented via a back-end application computer server. A vehicle telematics data store may contain electronic records and each electronic record may include, for example, an electronic record identifier and at least one vehicle operation parameter (e.g., a vehicle speed, an accident location, an accident time of day, etc.). The computer server may receive, from an emergency responder (e.g., a police officer, ambulance, firefighter, etc.) via an interactive graphical emergency responder interface display, a vehicle tag (e.g., based on a QR code). The computer server may then retrieve, from the vehicle telematics data store, a vehicle operation parameter associated with the vehicle tag and update the display based on the retrieved a vehicle operation parameter associated with the vehicle tag.

Some embodiments comprise: means for receiving, at the back-end application computer server from an emergency responder via an interactive graphical emergency responder interface display, a vehicle tag; means for retrieving, from a vehicle telematics data store, a vehicle operation parameter associated with the vehicle tag, wherein the vehicle telematics data store contains electronic records associated with a set of vehicles, each electronic record including an electronic record identifier and at least one vehicle operation parameter; and means for updating the interactive graphical emergency responder interface display based on the retrieved vehicle operation parameter associated with the vehicle tag.

In some embodiments, a communication device associated with a back-end application computer server exchanges information with remote devices in connection with an interactive graphical emergency responder interface. The information may be exchanged, for example, via public and/or proprietary communication networks.

A technical effect of some embodiments of the invention is an improved and computerized way to accurately and/or automatically provide vehicle telematics data to emergency responders in a way that provides fast and useful results. With these and other advantages and features that will become hereinafter apparent, a more complete understanding of the nature of the invention can be obtained by referring to the following detailed description and to the drawings appended hereto.

DETAILED DESCRIPTION

Figure 1:
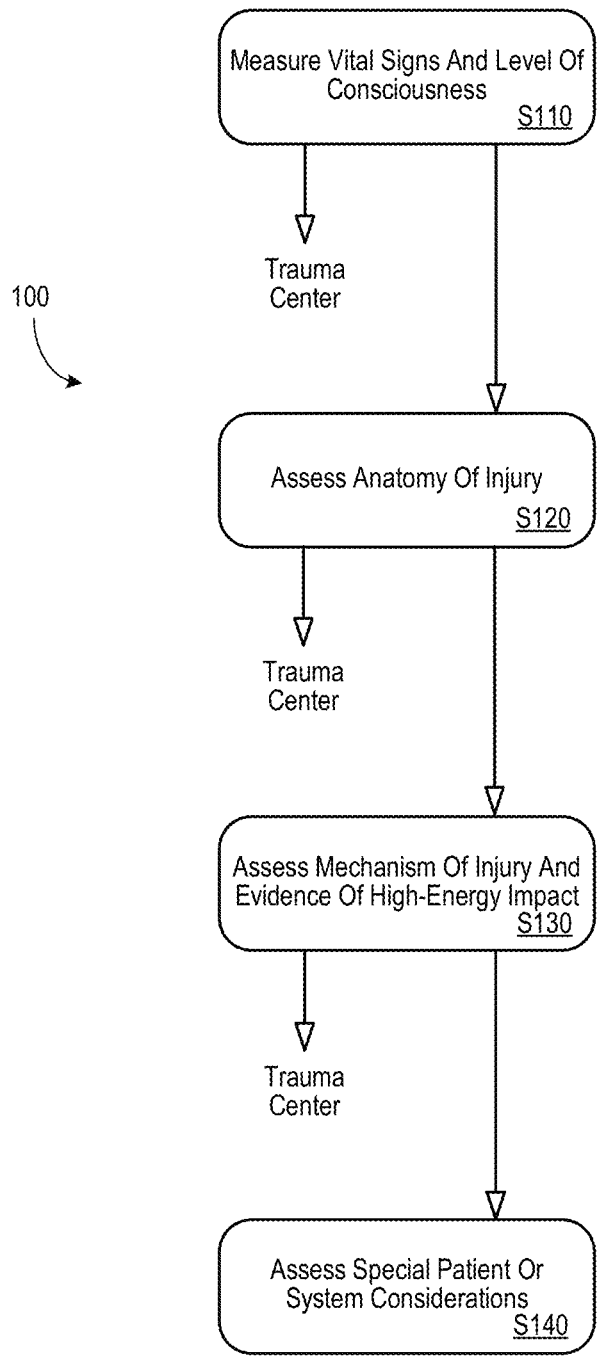
FIG. 1 is the US Center for Disease Control ("CDC") trauma triage protocol.

Before the various exemplary embodiments are described in further detail, it is to be understood that the present invention is not limited to the particular embodiments described. It is also to be understood that the terminology used herein is for the purpose of describing particular embodiments only and is not intended to limit the scope of the claims of the present invention.

In the drawings, like reference numerals refer to like features of the systems and methods of the present invention. Accordingly, although certain descriptions may refer only to certain figures and reference numerals, it should be understood that such descriptions might be equally applicable to like reference numerals in other figures.

The present invention provides significant technical improvements to facilitate data availability and analytics associated with an emergency response system. The present invention is directed to more than merely a computer implementation of a routine or conventional activity previously known in the industry as it provides a specific advancement in the area of electronic record availability and analysis by providing improvements in the operation of a computer system that makes telematics information available to emergency responders. The present invention provides improvement beyond a mere generic computer implementation as it involves the novel ordered combination of system elements and processes to provide improvements in the speed at which such data can be made available. Some embodiments of the present invention are directed to a system adapted to automatically determine telematics information, analyze electronic records, aggregate data from multiple sources, determine an appropriate response, etc. Moreover, communication links and messages may be automatically established, aggregated, formatted, exchanged, etc. to improve network performance (e.g., by reducing an amount of network messaging bandwidth and/or storage required to support emergency responders, eliminating the need for a central call center, support technological updates, etc.).

An insurer may already have many automotive accounts equipped with vehicles telematics to improve driver safety. Commonly, these telematics devices include dashboard cameras and Electronic Data Loggers ("ELDs"). The purpose of vehicle telematics is to record trip and accident data such as video, photographic, and location data. The recorded data provides a definitive record of events leading up to and during an accident. Traditionally, this data is used to aid the insurance litigation and claim handling process after the accident has occurred. As used herein, the term "telematics" may refer to telecommunications and vehicular technologies (road transport, road safety, etc.), electrical engineering (sensors, instrumentation, wireless communications, etc.), and computer science (multimedia, internet, etc.) and may involve: the technology of sending, receiving, and/or storing information; the integrated use of telecommunications and informatics for application in vehicles; global navigation satellite system technology integrated with computers and mobile communications technology in automotive navigation systems; etc. Telematics is growingly used for fleet management, safety and compliance, improved fuel efficiency, improved vehicle maintenance (e.g., reporting failure codes), litigation defense, etc.

Note that telematics information could be very useful to emergency responders who arrive at the scene of an accident. For example, dashboard camera video could show emergency responders the exact events leading up to the accident. Similarly, Inertial Measurement Units ("IMUs") can record the velocity of the vehicle prior to collision and accelerometers can measure the force of impact sustained by vehicle occupants. Delivering vehicle telematics data to first responders can give them the information needed to provide the best possible trauma care. Some embodiments described herein provide a software system that delivers telematics data to emergency responders actively at the scene of an accident.

Emergency Medical Services ("EMS") providers in the US make decisions about the most appropriate destination hospital for injured patients. These decisions are made through a decision process known as "field triage," which involves an assessment not only of the physiology and anatomy of the injury but also of the mechanism of the injury and special patient considerations. The goal of the field triage process is to ensure that injured patients are transported to a trauma center or hospital that is best equipped to manage their specific injuries in an appropriate and timely manner. FIG. 1 is the US Center for Disease Control ("CDC") trauma triage protocol 100. At S110, the emergency responder measures vital signs and evaluates the person's level of consciousness. If certain conditions are met (e.g., systolic blood pressure, respiratory rate, etc.), the person is sent to a trauma center. If those conditions are not met, the procedure continues at S120, where the emergency responder assess the anatomy of the person's injuries. Note that certain patients, on initial presentation to EMS providers, have normal physiology but have an anatomic injury that might require the highest level of care within the defined trauma system. Thus, if certain conditions are met (e.g., a head injury, a neck injury, broken bones, etc.), the person is sent to a trauma center.

If those conditions are not met, the procedure continues at S130, where the emergency responder assesses the Mechanism Of Injury ("MOI") and any evidence of high-energy impact. As part this evaluation, the CDC recommends reviewing any vehicle telemetry data that is available to determine if it is consistent with a high risk for injury. The telemetry data might include, for example, an indication of seat belt use, a direction of impact, "Delta V" (i.e., a change in velocity), high speed velocity, location of impact, and vehicle weight and type—which all may be predictors of severe injury. Finally, at S140 the emergency responder may assess any special patient or system considerations (e.g., patient age, pregnancy, etc.).

Figure 2:
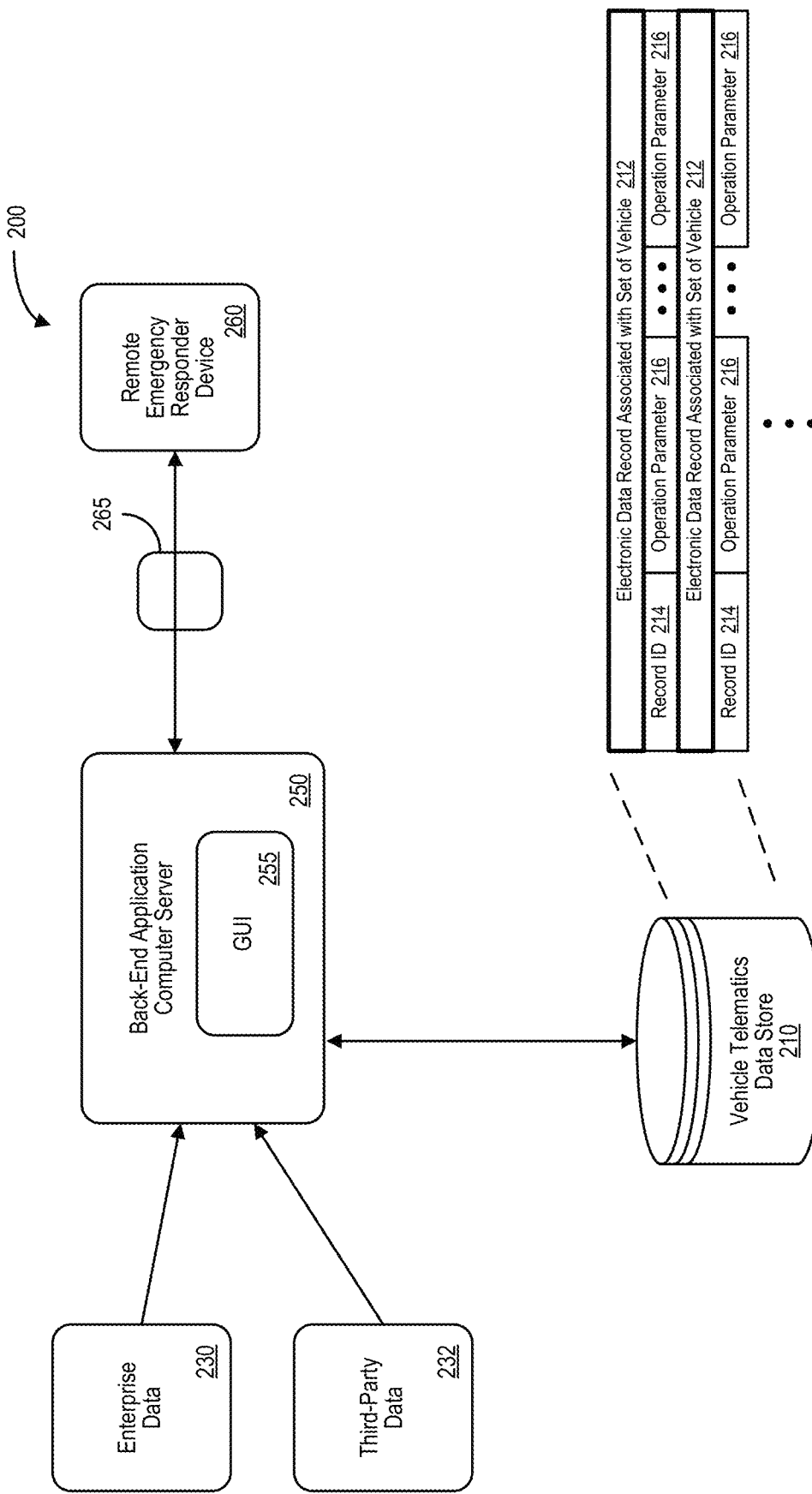
FIG. 2 is a high-level block diagram of an emergency response system in accordance with some embodiments.

FIG. 2 is a high-level block diagram of an emergency response system 200 according to some embodiments of the present invention. In particular, the system 200 includes a back-end application computer server 250 that may access information in a vehicle telematics data store 210 (e.g., storing a set of electronic records associated with a set of vehicles 212, each record including, for example, one or more record identifiers 214, operation parameters 216, etc.). The back-end application computer server 250 may also store information into other data stores and utilize Graphical User Interface ("GUI") 255 to view, analyze, and/or update the electronic records. The back-end application computer server 250 may also exchange information with a remote emergency responder device 260 (e.g., via a firewall 265). According to some embodiments, enterprise data 230 (e.g., insurer information about a vehicle or a vehicle occupant) and/or third-party data 232 (e.g., available security videos or Closed-Circuit Television ("CCTV") images) may aggregated and provided to an emergency responder (e.g., to help identify who should be sent to a trauma center) and/or the remote emergency responder device 260. Other examples of third-party data might include weather information (e.g., a weather service or satellite data indicating icy road conditions), traffic information, vehicle safety information (e.g., about manufacture recalls or safety warnings), etc. In some embodiments, the remote emergency responder device 260 may transmit annotated and/or updated information to the back-end application computer server 250. Based on the updated information, the back-end application computer server 250 may adjust data in the vehicle telematics data store 210 and/or the change may be viewable via other remote emergency responder devices. Note that the back-end application computer server 250 and/or any of the other devices and methods described herein might be associated with a third party, such as a vendor that performs a service for an enterprise.

The back-end application computer server 250 and/or the other elements of the system 200 might be, for example, associated with a Personal Computer ("PC"), laptop computer, smartphone, an enterprise server, a server farm, and/or a database or similar storage devices. According to some embodiments, an "automated" back-end application computer server 250 (and/or other elements of the system 200) may facilitate the automated access and/or update of electronic records. As used herein, the term "automated" may refer to, for example, actions that can be performed with little (or no) intervention by a human.

As used herein, devices, including those associated with the back-end application computer server 250 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 250 may store information into and/or retrieve information from the vehicle telematics data store 210. The data store 210 may be locally stored or reside remote from the back-end application computer server 250. As will be described further below, the vehicle telematics data store 210 may be used by the back-end application computer server 250 in connection with an interactive emergency responder interface to access and update electronic records. Although a single back-end application computer server 250 is shown in FIG. 2, any number of such devices may be included. Moreover, various devices described herein might be combined according to embodiments of the present invention. For example, in some embodiments, the back-end application computer server 250 and vehicle telematics data store 210 might be co-located and/or may comprise a single apparatus and/or be implemented via a cloud-based computing environment.

In this way, embodiments may provide software system that delivers vehicle telematics data to emergency responders at the scene of an accident. According to some embodiments, unique identifiers or "tags" are attached to participating vehicles that are already equipped with telematics devices. At the scene of an accident, registered emergency responders may scan the vehicle tag with a smartphone to retrieve telematics data from the accident, such as dashboard camera video, impact force measurements, vehicle speed prior to collision, vehicle occupant emergency-contact information, etc.

Figure 3:
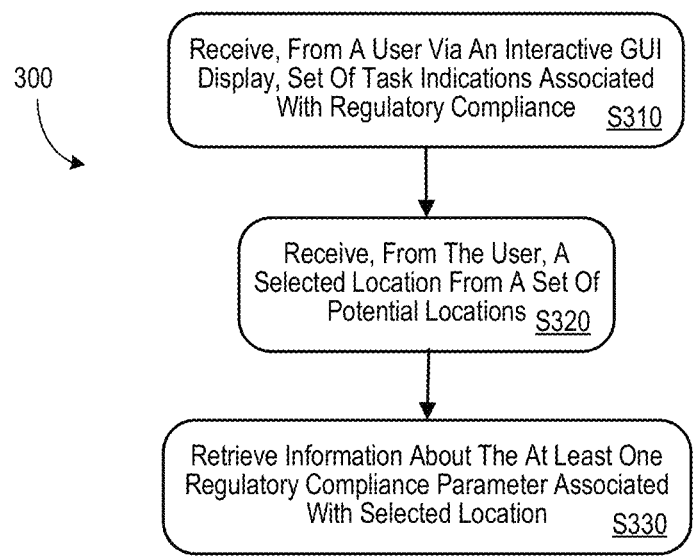
FIG. 3 illustrates an emergency response method according to some embodiments of the present invention.

Note that the system 200 of FIG. 2 is provided only as an example, and embodiments may be associated with additional elements or components. According to some embodiments, the elements of the system 200 automatically transmit information associated with an interactive emergency responder interface display over a distributed communication network. FIG. 3 illustrates a method 300 that might be performed by some or all of the elements of the system 200 described with respect to FIG. 2, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, a back-end application computer server may receive, from an emergency responder via an interactive graphical emergency responder interface display, a vehicle tag. The emergency responder might be associated with, for example, an ambulance, a police officer, a firefighter, a military or other governmental responder (e.g., a US National Guard member responding to a flood or hurricane), etc. As used herein, the term "vehicle" might refer to an automobile, an electric vehicle, a self-driving or autonomous vehicle, a motorcycle, a snowmobile, a train, an airplane, a helicopter, a bicycle, a truck, a tractor, a van, a delivery vehicle, a bus, a construction vehicle (e.g., a bulldozer, crane, or backhoe), etc.

Figure 4:
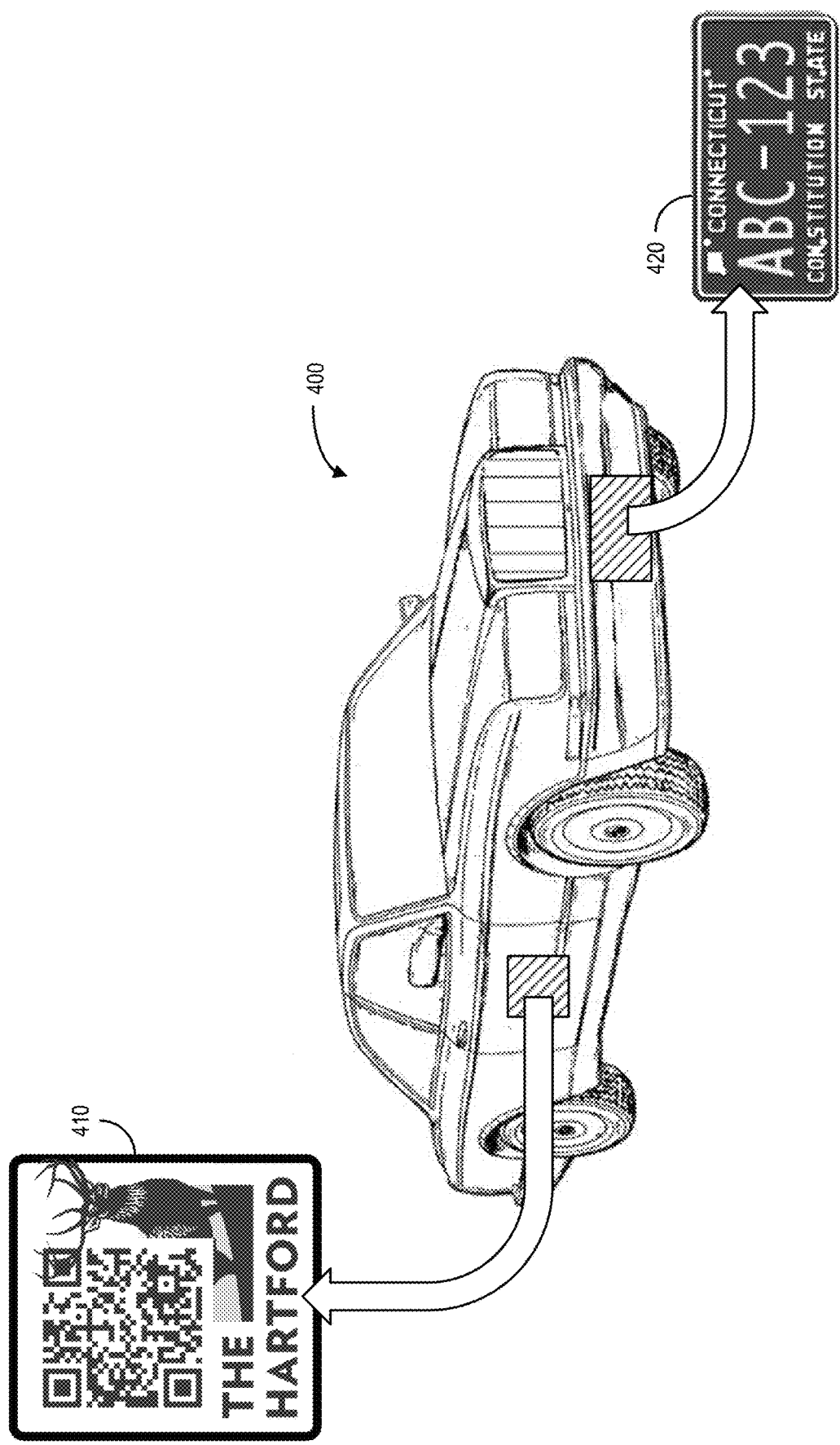
FIG. 4 is an example of a vehicle in accordance with some embodiments.

Moreover, the term "vehicle tag" may refer to any type of identifier that can be used to identify the vehicle. For example, FIG. 4 illustrates a vehicle 400 in accordance with some embodiments. In this case, an adhesive sticker or a magnetic label may include a Quick Response ("QR") code 410 that identified the vehicle 400. As used herein, the term "QR code" may refer to a type of matrix barcode (or two-dimensional barcode) comprising a machine-readable optical label that contains information about the item to which it is attached (e.g., data for a locator, an identifier, or a tracker that points to a website or application). In other embodiments, a simple one-dimensional bar code, a Near Field Communication ("NFC") device, Bluetooth, Radio Frequency Identification ("RFID"), etc. may be used to identify the vehicle 400. In some embodiments, an existing identifier, such as a license plate 420, may be used for this purpose.

Figure 5:
FIG. 5 is an emergency response system display according to some embodiments.

FIG. 5 is an emergency response system display 500 according to some embodiments. The emergency responder may use the camera in his or her smartphone to capture an image 510 of the QR code. The image 510 may then be translated and transmitted via a "Submit" icon 520. Referring again to FIG. 3, at S320 the system may retrieve, from a vehicle telematics data store, a vehicle operation parameter associated with the vehicle tag. The vehicle telematics data store may, for example, contain electronic records associated with a set of vehicles, each electronic record including an electronic record identifier and at least one vehicle operation parameter. The vehicle operation parameter might be associated with any type of vehicle telematics data. Examples of a vehicle operation parameter include a speed, an accident location (e.g., a street address or latitude and longitude), an acceleration, a dashboard camera photograph or video, an impact force measurement, an inertial measurement unit, rotation information (e.g., indicating how many times the vehicle rolled over), an accident time of day, an accident duration, airbag information (indicating if the airbag successfully deployed), emergency contact information (e.g., a telephone number or email address), etc.

Figure 6:
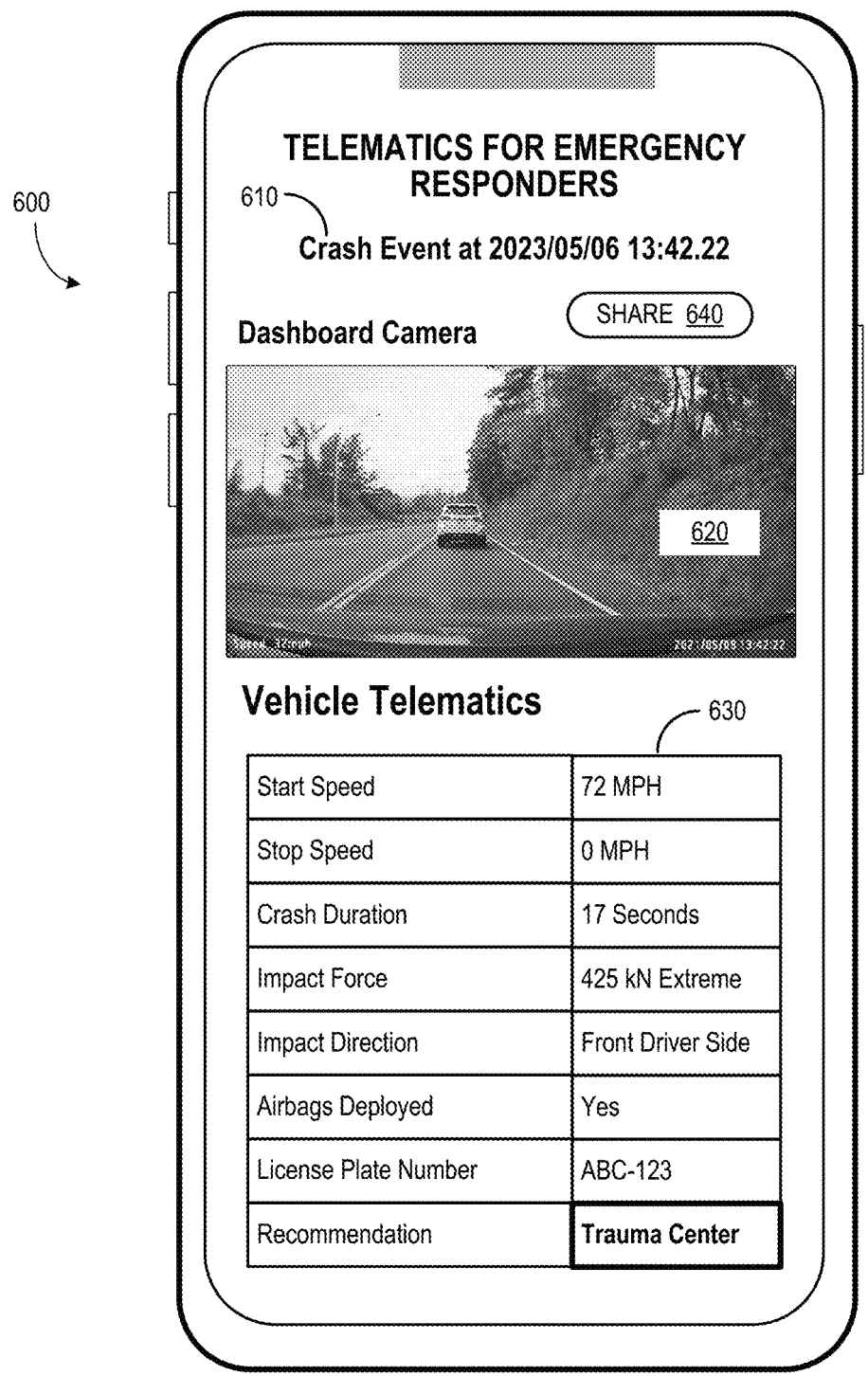
FIG. 6 is an updated emergency response system display according to some embodiments.

At S330, the system may update the interactive graphical emergency responder interface display based on the retrieved vehicle operation parameter associated with the vehicle tag. The interactive graphical emergency responder interface display might be associated with, for example, a smartphone, a handheld or tablet computer, a smartwatch, a device mounted in an emergency response vehicle (e.g., on the dashboard of a police car), etc. FIG. 6 is an updated emergency response system display 600 according to some embodiments. In particular, the display 600 has been updated to reflect a crash event 610 for a particular vehicle. The display 600 can provide dashboard camera images 620, vehicle telematic information 630, an automatically generated trauma recommendation (e.g., based on a machine learning algorithm and analysis of past accidents), etc. According to some embodiments, a "Share" icon 640 can be used by the emergency responder to send the information to other responders (e.g., a police officer might send the information to an ambulance en route to the accident or to a local emergency room).

According to some embodiments, the back-end application computer server also determines at least one supplemental responder. Moreover, one or more vehicle operational parameters may be automatically transmitted to a device associated with the supplemental responder (e.g., via an automatically established communication link). For example, a database may include communication addresses of multiple supplemental responders who might find the vehicle telematics information useful. The supplemental responder might be associated with, for example, an emergency response vehicle, an ambulance, a hospital, an emergency room, a medical care provider (e.g., a doctor's office), etc.

In some embodiments, the back-end application computer server is associated with an insurance company. In this case, the set of vehicles might be associated with one or more insurance policies. For example, the insurer might provide telematics information associated with all automobile insurance customers or for a fleet of vehicles operated by a single customer. Vehicle information from the insurance policies might be used to supplement and/or interpret the telematics data.

According to some embodiments, participating vehicles (e.g., insurance customers) that are already equipped with telematics devices are provided with a unique "tag" (e.g., a sticker or magnet) that is attached to the rear of the vehicle. When responding to an accident, an emergency responder can scan the vehicle tag with an internet enabled device (i.e., via a smartphone). Once scanned, the internet enabled device request telematics data from the insurance company software system. Recognizing the vehicle's unique identifier included in the data request, the insurance company software system retrieves telematics data from one or more telematics equipment vendor APIs and returns that data to the first responder's device.

Figure 7:
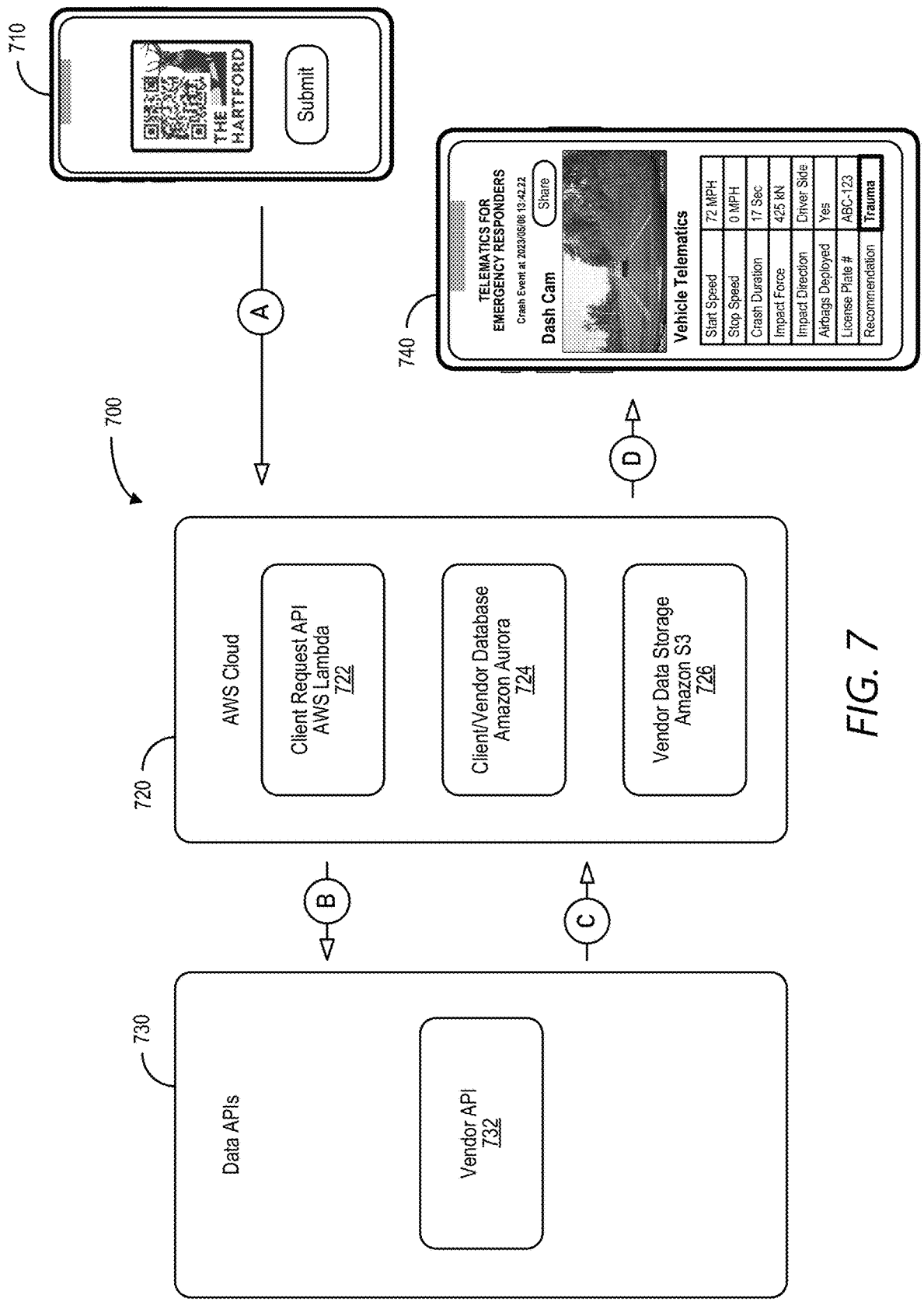
FIG. 7 is a technology architecture model according to some embodiments.

FIG. 7 is a technology architecture model 700 according to some embodiments. At (A), an internet enabled device 710 submits a request to a cloud computing environment 720 (e.g., via a web site and tag identifier defined by a QR code). In some cases, a vehicle tag might be associated with an optical image that the device 710 converts into a web address or other identifier. In other cases, the device 810 might transmit the optical image to the cloud computing environment 720. The cloud computing environment 720 might be associated with, for example, the AMAZON® Web Services ("AWS") cloud and include a client request API 722 (e.g., the AMAZON® Lambda event-driven, serverless computing platform), a client/vendor database 724 (e.g., the AMAZON® Aurora relational database service), and vendor data storage 726 (e.g., AMAZON® Simple Storage Service ("S3") to provide object storage through a web service interface). At (B), the cloud computing environment 720 submits the request to data APIs 730 (e.g., a vendor API 732) and a response to the request is received at (C). The cloud computing environment 720 can then update the emergency responder's display 740 with the appropriate telematics data at (D).

In this way, the insurance company software system may enable data delivery between telematics vendors and emergency responders. The insurance company software system may include, according to some embodiments:

A request API that receives requests from emergency responders and responds with vehicle telematics data. Additionally, the API may support the registration and removal of vehicle tags and emergency responders.

A database of vehicle tags and registered emergency responders. The vehicle tag information may be used to identify vehicles and the inventory of telematics devices in the vehicle. The registered emergency responder information is used to identify the entity requesting vehicle data (to prevent unauthorized data sharing).

A storage location for large data artifacts so they can be returned quickly in response to a request from a registered emergency responder.

Telematics vendor API integrations. The software system may support any telematics vendor used by customers of the insurance company who have vehicles equipped with telematics devices.

Figure 8:
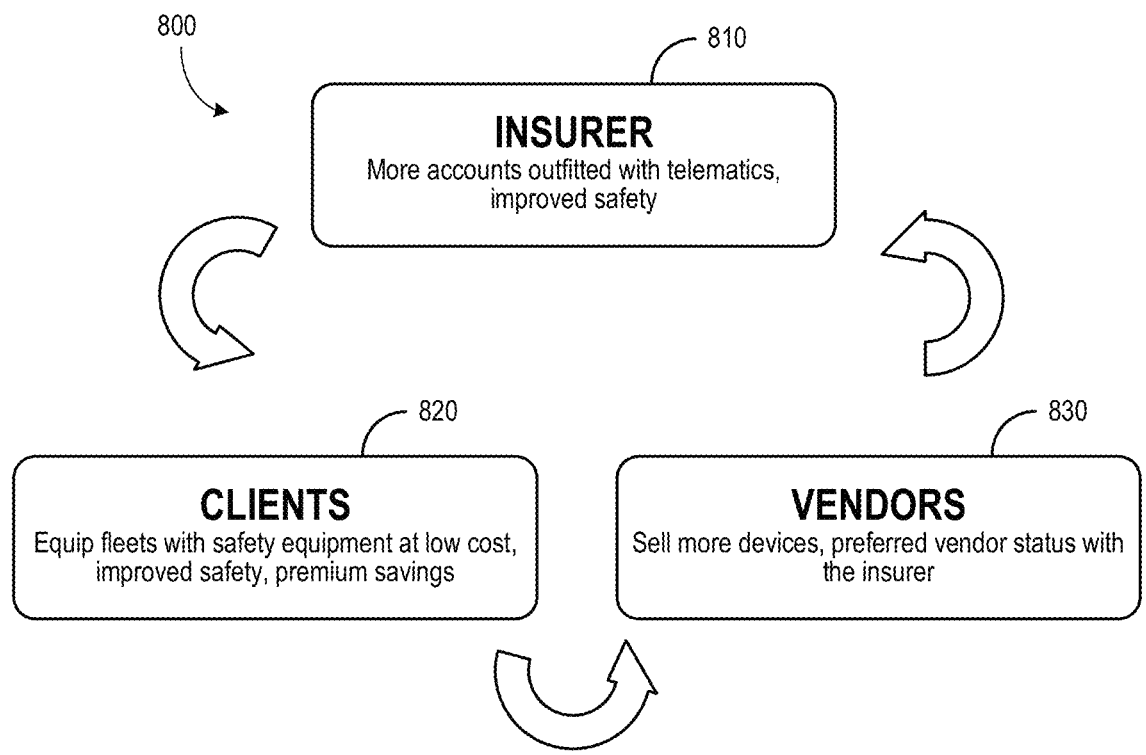
FIG. 8 illustrates some mutual benefits of an emergency responder system in accordance with some embodiments.

FIG. 8 illustrates 800 some mutual benefits of an emergency responder system in accordance with some embodiments. An insurer 810 may achieve more accounts that are outfitted with telematics (which can result in improved safety). Clients 820 may be able to reduce costs when equipping fleets with safety equipment, realize improved vehicle safety, and achieve premium savings. Vendors 830 may sell more telematics devices and/or achieve a preferred vendor status with the insurer 810.

Figure 9:
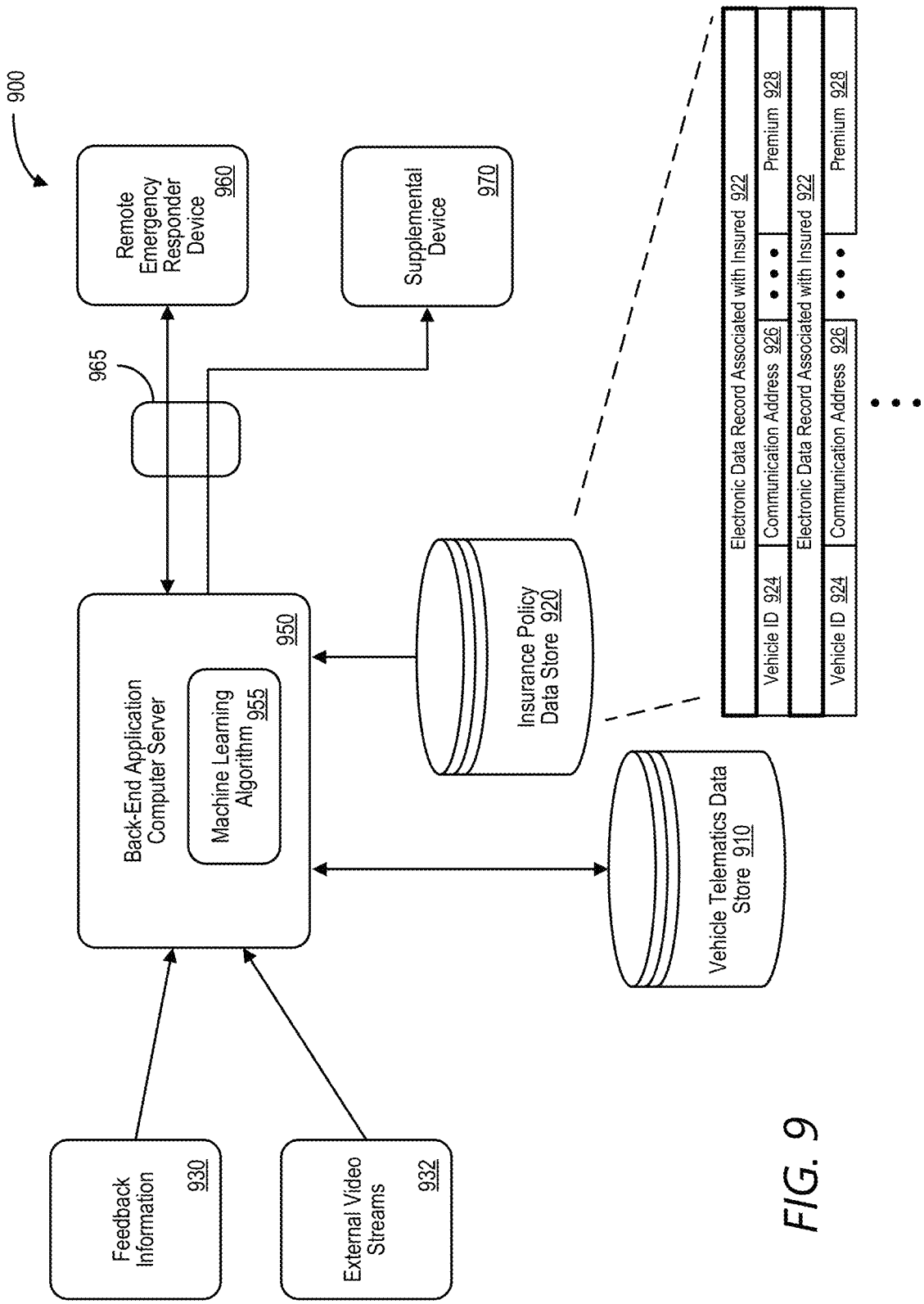
FIG. 9 is a more detailed block diagram of an emergency response system according to some embodiments.

FIG. 9 is a more detailed block diagram of an emergency response system 900 according to some embodiments. As before, the system 900 includes a back-end application computer server 950 that may access information in a vehicle telematics data store 910 (e.g., storing a set of electronic records associated with vehicles). The back-end application computer server 950 may also utilize information in other data stores, such as insurance policy data store 920 (e.g., storing electronic records associated with insurance policies/insured customers 922, a vehicle identifier 924, a communication address 926, and an insurance premium value 928) and utilize a machine learning algorithm 955 to view, analyze, and/or update the electronic records. As used herein, the phrase "machine learning algorithm" may refer to any artificial intelligence process trained using historical data and/or outcomes. The back-end application computer server 950 may also exchange information with a first remote emergency responder device 960 and a second remote emergency responder device 970 (e.g., via a firewall 965). According to some embodiments, an interactive GUI platform of the back-end application computer server 950 (and, in some cases, feedback information 930 to further train and improve the machine learning algorithm 955 and/or external video streams 932 such as CCTV video) may facilitate reports about triage decisions, predictions, and/or the display of results via one or more remote administrator computers (e.g., to identify potential problems) and/or the remote emergency responder devices 960, 970. For example, the first remote emergency responder device 960 may transmit annotated and/or updated information to the back-end application computer server 950. Based on the updated information, the back-end application computer server 950 may adjust data in the vehicle telematics data store 910 and/or the insurance policy data store 920 (e.g., information to automatically open an insurance claim file) and the change might (or might not) be viewable via the second remote emergency responder device 970.

The back-end application computer server 950 and/or the other elements of the system 900 might be, for example, associated with a PC, laptop computer, smartphone, an enterprise server, a server farm, and/or a database or similar storage devices. As used herein, devices, including those associated with the back-end application computer server 950 and any other device described herein, may exchange information via any communication network which may be one or more of a LAN, a MAN, a WAN, a proprietary network, a PSTN, a WAP network, a Bluetooth network, a wireless LAN network, and/or an IP network such as the Internet, an intranet, or an extranet.

The back-end application computer server 950 may store i0nformation into and/or retrieve information from the vehicle telematics data store 910 and/or the insurance policy data store 920. The data elements 910, 920 may be locally stored or reside remote from the back-end application computer server 950. As will be described further below, the vehicle telematics data store 910 may be used by the back-end application computer server 950 in connection with an interactive GUI to let emergency responders access and/or update electronic records. Although a single back-end application computer server 950 is shown in FIG. 9, any number of such devices may be included.

Figure 10:
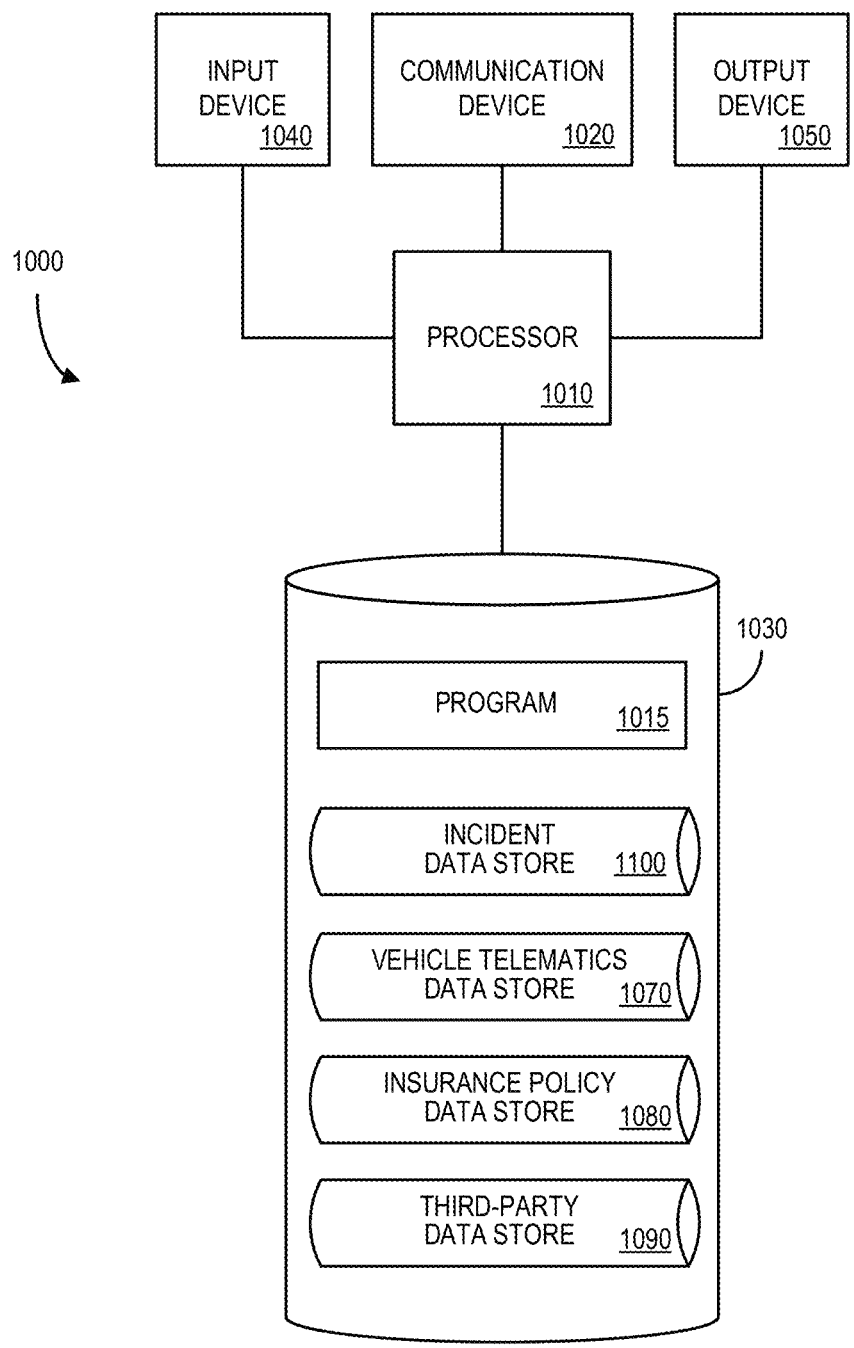
FIG. 10 is a block diagram of an apparatus in accordance with some embodiments of the present invention.

The embodiments described herein may be implemented using any number of different hardware configurations. For example, FIG. 10 illustrates an apparatus 1000 that may be, for example, associated with the system 200 described with respect to FIG. 2. The apparatus 1000 comprises a processor 1010, such as one or more commercially available Central Processing Units ("CPUs") in the form of one-chip microprocessors, coupled to a communication device 1020 configured to communicate via a communication network (not shown in FIG. 10). The communication device 1020 may be used to communicate, for example, with one or more remote emergency responder devices (e.g., PCs and smartphones), administrator computers, and/or third-party platforms. Note that data exchanged via the communication device 1020 may utilize security features, such as encryption between an emergency responder and an internal network of an insurance company and/or telematics enterprise. The security features might be associated with, for example, web servers, firewalls, and/or PCI infrastructure. The apparatus 1000 further includes an input device 1040 (e.g., a mouse and/or keyboard to enter information about data sources, telematic vendor APIs, third-parties, etc.) and an output device 1050 (e.g., to output reports regarding performance, summary logs, recommended actions, alerts, etc.).

The processor 1010 also communicates with a storage device 1030. The storage device 1030 may comprise any appropriate information storage device, including combinations of magnetic storage devices (e.g., a hard disk drive), optical storage devices, mobile telephones, and/or semiconductor memory devices. The storage device 1030 stores a program 1015 and/or emergency response system or application for controlling the processor 1010. The processor 1010 performs instructions of the program 1015, and thereby operates in accordance with any of the embodiments described herein. For example, the processor 1010 may receive, from an emergency responder (e.g., a police officer or Emergency Medical Technician ("EMT")) via an interactive GUI display, a vehicle tag. The processor 1010 may then retrieve, from a vehicle telematics data store, a vehicle operation parameter (e.g., a vehicle speed) associated with the vehicle tag and update the display based on the retrieved a vehicle operation parameter associated with the vehicle tag.

The program 1015 may be stored in a compressed, uncompiled and/or encrypted format. The program 1015 may furthermore include other program elements, such as an operating system, a database management system, and/or device drivers used by the processor 1010 to interface with peripheral devices.

As used herein, information may be "received" by or "transmitted" to, for example: (i) the apparatus 1000 from another device; or (ii) a software application or module within the apparatus 1000 from another software application, module, or any other source.

In some embodiments (such as shown in FIG. 10), the storage device 1030 further stores an incident data store 1100 (e.g., associated with automatically detected or reported vehicle crash events), a vehicle telematics data store 1070 (e.g., associated with a vendor), an insurance policy data store 1080 (e.g., with an insurer), and a third-party data store 1090 (e.g., storing information that can update and/or aggregate the information in the vehicle telematics data store 1070). An example of a database that might be used in connection with the apparatus 1000 will now be described in detail with respect to FIG. 11. Note that the database described herein is only an example, and additional and/or different information may be stored therein. Moreover, various databases might be split or combined in accordance with any of the embodiments described herein. For example, the incident data store 1100 and insurance policy data store 1080 might be combined and/or linked to each other within the program 1015.

Figure 11:
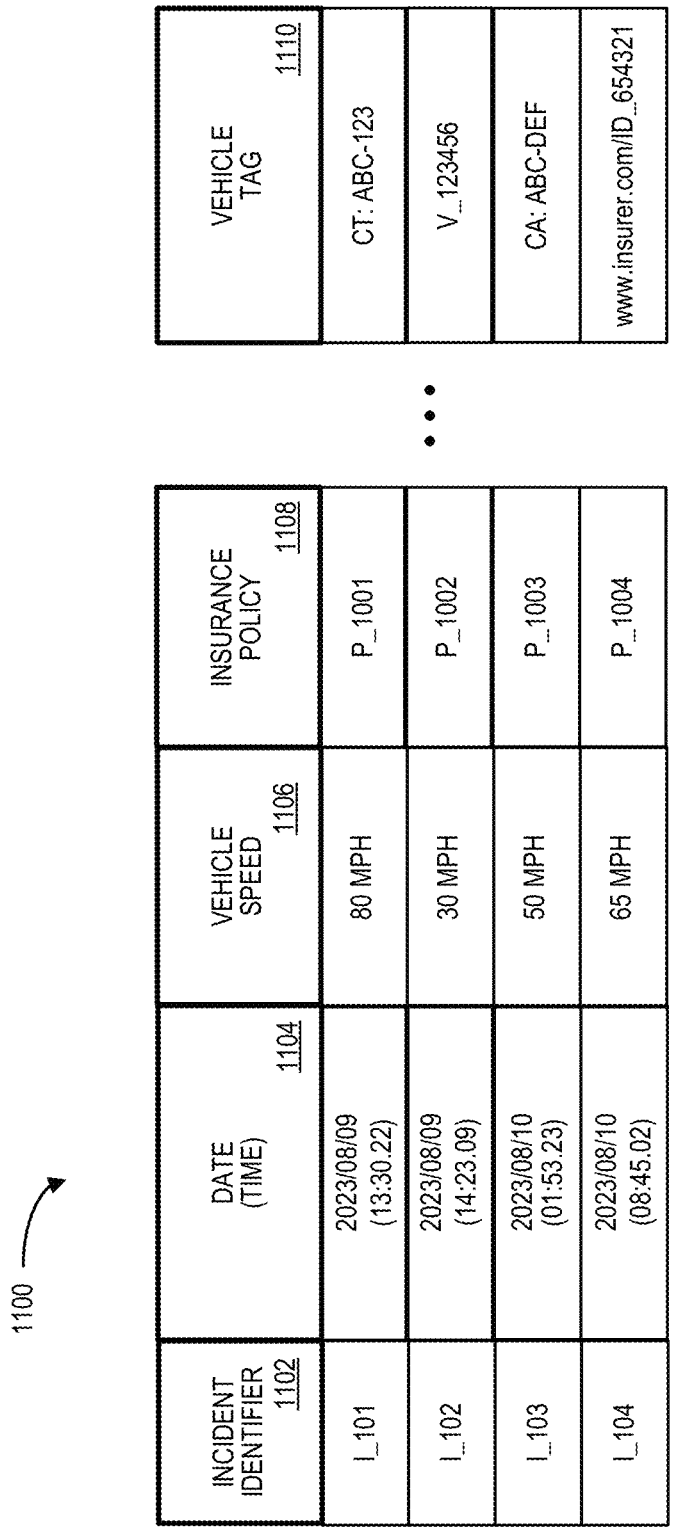
FIG. 11 is a portion of an incident data store according to some embodiments.

Referring to FIG. 11, a table is shown that represents the incident data store 1100 that may be stored at the apparatus 1000 according to some embodiments. The table may include, for example, entries associated with vehicle crashes. The table may also define fields 1102, 1104, 1106, 1108, 1110 for each of the entries. The fields 1102, 1104, 1106, 1108, 1110 may, according to some embodiments, specify: an incident identifier 1102, date and time 1104, a vehicle speed 1106, an insurance policy identifier 1108, and a vehicle tag 1110. The incident data store 1100 may be created and updated, for example, based on information electrically received from various data sources (e.g., including when an emergency responder submits a vehicle tag) that are associated with an insurer.

The incident identifier 1102 may be, for example, a unique alphanumeric code identifying a vehicle crash that occurred at the date and time 1104 (either detected based on an automatic determination by a machine learning algorithm or by the receipt of information from an emergency responder). The vehicle speed 1106 may represent, for example, one of any number of vehicle operation parameters representing telematics data. The insurance policy identifier 1108 may link the accident and/or vehicle to a particular insurance policy, and the vehicle tag 1110 may identify the specific vehicle associated with the accident.

Thus, embodiments may provide an automated and efficient way to help an emergency responder make triage decisions. The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to specific types of enterprises, embodiments may instead be associated with other types of enterprises in addition to and/or instead of those described herein (e.g., police departments, hospitals, etc.). Similarly, although certain types of telematics parameters were described in connection some embodiments herein, other types of telematics parameters might be used instead of, or in addition to, those mentioned.

Figure 12:
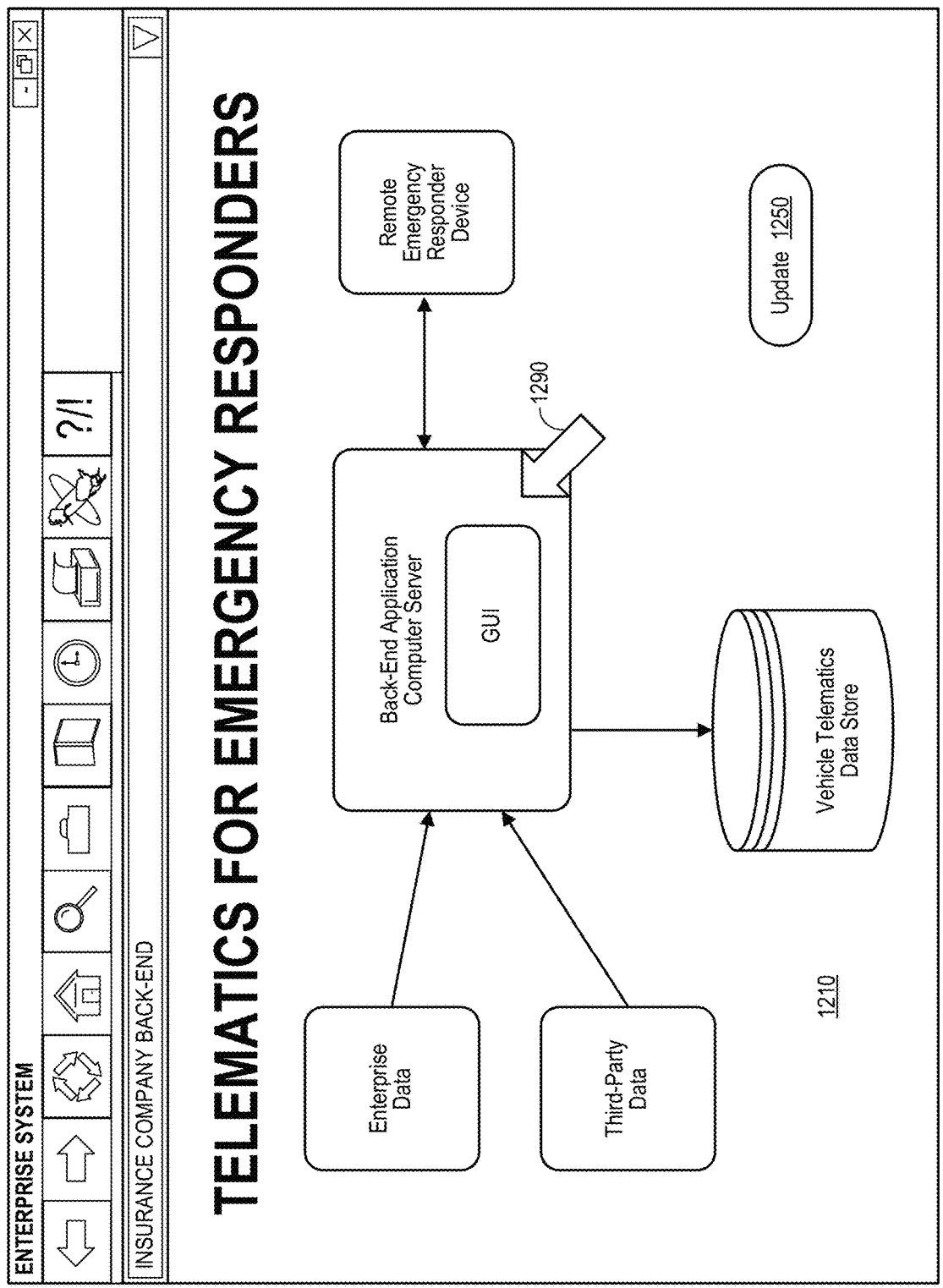
FIG. 12 illustrates an administrator display in accordance with some embodiments.

Note that the displays and devices illustrated herein are only provided as examples, and embodiments may be associated with any other types of interfaces. For example, FIG. 12 is an emergency response administrator display 1200 including graphical representations of elements 1210 of an emergency response system. Selection of a portion or element of the display 1200 might result in the presentation of additional information about that portion or device (e.g., a popup window presenting a more detailed view of mappings or other specifics of the system implementation) or let an operator or administrator enter or annotate additional information about emergency response system (e.g., based on his or her experience and expertise). Selection of an "Update" icon 1250 (e.g., by touchscreen or computer mouse pointer 1290) might cause the system or platform to save changes, transmit a report to another party, etc.

Figure 13:
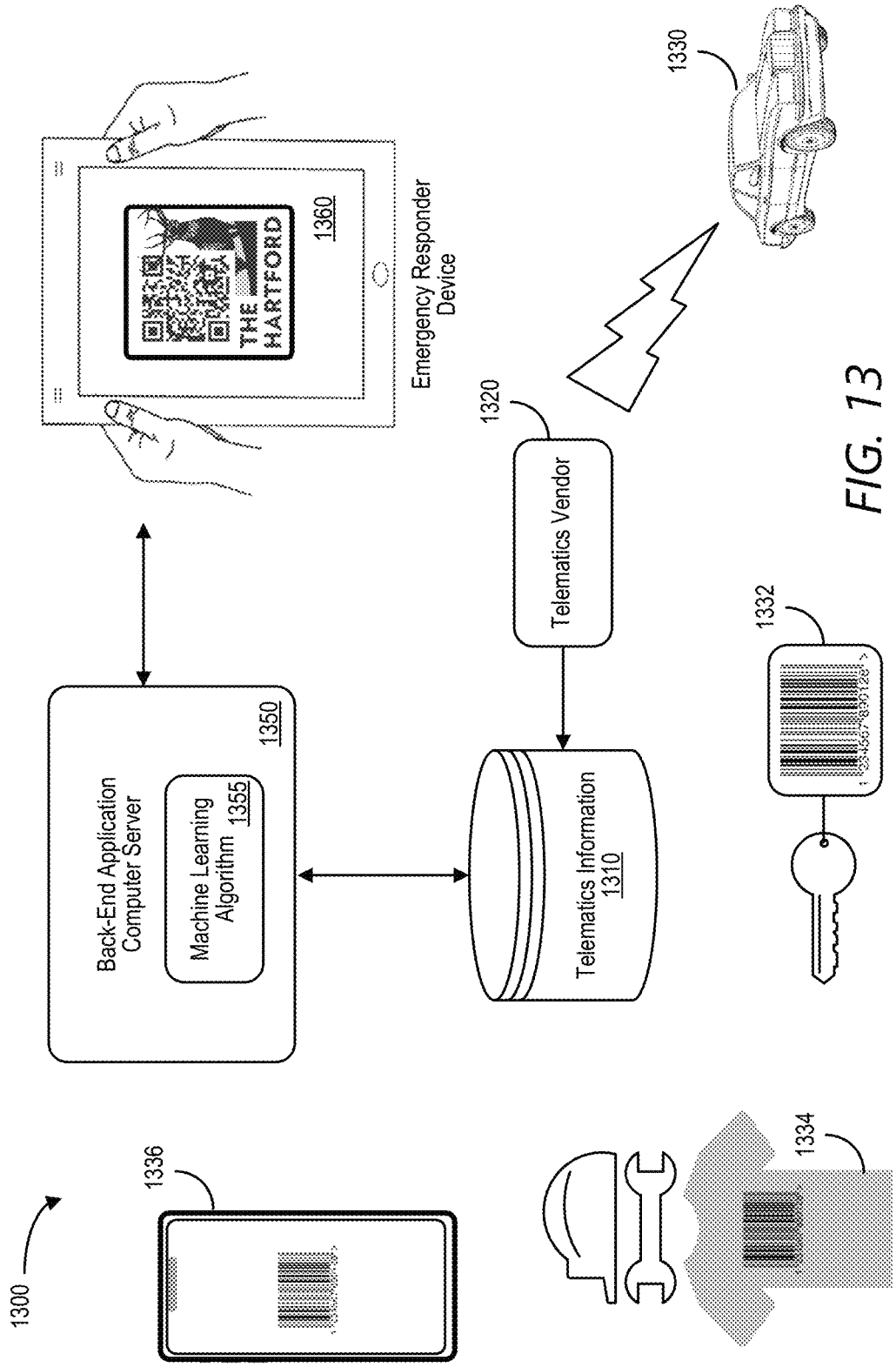
FIG. 13 illustrates some additional features according to some embodiments.

FIG. 13 illustrates some additional features according to some embodiments. As before, the system 1300 includes a back-end application computer server 1350 that may access information in a vehicle telematics data store 1310 (e.g., storing a set of electronic records associated with vehicles based on information about vehicles 1330 received via one or more telematics vendors 1320). The back-end application computer server 1350 may also utilize a machine learning algorithm 1355 to view, analyze, and/or update the electronic records. The back-end application computer server 1350 may also exchange information with a remote emergency responder device 1360. In addition to a vehicle tag received from a vehicle 1330, in some embodiments an identifier might be based on a bar code associated with a keychain 1332 (e.g., an identifier that is associated with a person as opposed to a vehicle). Similarly, embodiments may be associated with tags that are associated with wearable items 1334 (e.g., to help determine injury information for a worker at a construction site). Still other embodiments may retrieve a tag from a device, such as a smartphone 1336 that is associated with a person instead of a vehicle (and that smartphone 1336 may also act as the device that collects the telematics information being reported).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. An emergency response system implemented via a back-end application computer server, comprising:
   (a) a vehicle telematics data store that contains electronic records associated with a set of vehicles, each electronic record including an electronic record identifier and at least one vehicle operation parameter;
   (b) the back-end application computer server, coupled to the vehicle telematics data store, including:
   a computer processor, and
   a computer memory, coupled to the computer processor, storing instructions that, when
   executed by the computer processor cause the back-end application computer server to:
   (i) receive, from an emergency responder via an interactive graphical emergency responder interface display, a vehicle tag,
   (ii) automatically retrieve, from the vehicle telematics data store, a vehicle operation parameter associated with the vehicle tag,
   (iii) update the interactive graphical emergency responder interface display based
   on the retrieved vehicle operation parameter associated with the vehicle tag;
   (iv) determine at least one supplemental responder; and
   (v) transmit the vehicle operation parameter from a vehicle attached to the vehicle tag to a supplemental responder device via the back-end application computer server in response to an indication by the emergency responder; and
   (c) a communication port coupled to the back-end application computer server to facilitate a transmission of data with a remote emergency responder device to support the interactive graphical emergency responder interface display, including the update, via a distributed communication network.

2. The system of claim 1, wherein the emergency responder is associated with at least one of: (i) an ambulance, (ii) a police officer, (iii) a firefighter, and (iv) a military responder.

3. The system of claim 1, wherein the vehicle is associated with at least one of: (i) an automobile, (ii) an electric vehicle, (iii) an autonomous vehicle, (iv) a motorcycle, (v) a snowmobile, (vi) a train, (vii) an airplane, (viii) a helicopter, (ix) a bicycle, (x) a truck, (xi) a tractor, (xii) a van, (xiii) a delivery vehicle, (xiv) a bus, and (xv) a construction vehicle.

4. The system of claim 1, wherein the vehicle operation parameter is associated with speed, an accident location and at least one of: (i) an acceleration, (ii) dashboard camera video, (iii) an impact force measurement, (iv) an inertial measurement unit, (v) rotation information, (vi) an accident time of day, (vii) an accident duration, (viii) airbag information, and (ix) emergency contact information.

5. The system of claim 1, wherein the supplemental responder is associated with at least one of: (i) an emergency response vehicle, (ii) an ambulance, (iii) a hospital, (iv) an emergency room, and (v) a medical care provider.

6. The system of claim 1, wherein the back-end application computer server is associated with an insurance company.

7. The system of claim 6, wherein the set of vehicles are associated with insurance policies.

8. The system of claim 1, wherein the vehicle tag is associated with at least one of: (i) an adhesive sticker, (ii) a magnetic label, (iii) a Quick Response ("QR") code, (iv) a bar code, and (v) a license plate.

9. The system of claim 1, wherein the interactive graphical emergency responder interface display is associated with at least one of: (i) a smartphone, (ii) a tablet computer, (iii) a smartwatch, and (iv) a device mounted in an emergency response vehicle.

10. A computerized emergency response method implemented via a back-end application computer server, comprising:
receiving, at the back-end application computer server from an emergency responder via an interactive graphical emergency responder interface display, a vehicle tag;
retrieving, from a vehicle telematics data store, a vehicle operation parameter associated with the vehicle tag, wherein the vehicle telematics data store contains electronic records associated with a set of vehicles, each electronic record including an electronic record identifier and at least one vehicle operation parameter;
updating the interactive graphical emergency responder interface display based on the retrieved vehicle operation parameter associated with the vehicle tag;
determining at least one supplemental responder; and
transmitting the vehicle operation parameter from a vehicle attached to the vehicle tag to a supplemental responder device via the back-end application computer server in response to an indication by the emergency responder.

11. The method of claim 10, wherein the emergency responder is associated with at least one of: (i) an ambulance, (ii) a police officer, (iii) a firefighter, and (iv) a military responder.

12. The method of claim 10, wherein the vehicle is associated with at least one of: (i) an automobile, (ii) an electric vehicle, (iii) an autonomous vehicle, (iv) a motorcycle, (v) a snowmobile, (vi) a train, (vii) an airplane, (viii) a helicopter, (ix) a bicycle, (x) a truck, (xi) a tractor, (xii) a van, (xiii) a delivery vehicle, and (xiv) a bus.

13. The method of claim 10, wherein the vehicle operation parameter is associated with a speed, an accident location and at least one of: (i) an acceleration, (ii) dashboard camera video, (iii) an impact force measurement, (iv) an inertial measurement unit, (v) rotation information, (vi) an accident time of day, (vii) an accident duration, (viii) airbag information, and (ix) emergency contact information.

14. The method of claim 10, wherein the supplemental responder is associated with at least one of: (i) an emergency response vehicle, (ii) an ambulance, (iii) a hospital, (iv) an emergency room, and (v) a medical care provider.

15. A non-transitory, computer-readable medium storing instructions, that, when executed by a processor, cause the processor to perform an emergency response method implemented via a back-end application computer server, the method comprising:
receiving, at the back-end application computer server from an emergency responder via an interactive graphical emergency responder interface display, a vehicle tag;
retrieving, from a vehicle telematics data store, a vehicle operation parameter associated with the vehicle tag, wherein the vehicle telematics data store contains electronic records associated with a set of vehicles, each electronic record including an electronic record identifier and at least one vehicle operation parameter;
updating the interactive graphical emergency responder interface display based on the retrieved vehicle operation parameter associated with the vehicle tag;
determining at least one supplemental responder; and
transmitting the vehicle operation parameter from a vehicle attached to the vehicle tag to a supplemental responder device via the back-end application computer server in response to an indication by the emergency responder.

16. The medium of claim 15, wherein the back-end application computer server is associated with an insurance company.

17. The medium of claim 16, wherein the set of vehicles are associated with insurance policies.

18. The medium of claim 15, wherein the vehicle tag is associated with at least one of: (i) an adhesive sticker, (ii) a magnetic label, (iii) a Quick Response ("QR") code, (iv) a bar code, and (v) a license plate.

19. The medium of claim 15, wherein the interactive graphical emergency responder interface display is associated with at least one of: (i) a smartphone, (ii) a tablet computer, (iii) a smartwatch, and (iv) a device mounted in an emergency response vehicle.

* * * * *